United States Patent
Nakano et al.

(10) Patent No.: US 6,273,230 B1
(45) Date of Patent: *Aug. 14, 2001

(54) BALL BEARING AND ELECTROMAGNETIC CLUTCH HAVING THE SAME

(75) Inventors: Yuji Nakano; Hirotoshi Aramaki; Hiroshi Ishiguro, all of Kanagawa (JP)

(73) Assignee: NSK Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/471,006

(22) Filed: Dec. 23, 1999

(30) Foreign Application Priority Data

Dec. 24, 1998 (JP) .................................... 10-366883
Oct. 26, 1999 (JP) .................................... 11-304046

(51) Int. Cl.⁷ ........................ F16D 27/112; F16C 33/58; F16C 19/06
(52) U.S. Cl. ................. 192/84.961; 192/110 B; 384/540; 384/516
(58) Field of Search .............. 192/84.961, 110 B; 384/450, 492, 516

(56) References Cited

U.S. PATENT DOCUMENTS

| | | | |
|---|---|---|---|
| 2,142,477 | * 1/1939 | Murden | 384/516 |
| 3,674,357 | 7/1972 | Ladin et al. | |
| 3,762,516 | * 10/1973 | Matsushita | 192/84.961 |
| 4,334,721 | 6/1982 | Satoh et al. | |
| 4,523,863 | 6/1985 | Okoshi | |
| 4,565,457 | * 1/1986 | Flander | 384/450 |
| 5,228,786 | * 7/1993 | Tanimoto et al. | 384/492 |
| 6,082,906 | * 7/2000 | Satou et al. | 384/516 |

FOREIGN PATENT DOCUMENTS

| | | |
|---|---|---|
| V 6349 47 | 6/1955 | (DE) . |
| 24 54 079 A1 | 5/1975 | (DE) . |
| 26 45 287 C3 | 4/1978 | (DE) . |
| 32 11 096 A1 | 11/1982 | (DE) . |
| 44 35 831 A1 | 4/1996 | (DE) . |

OTHER PUBLICATIONS

Hochleistungskeramik in FAG Wälzlagern: Erkennmisse aus der Entwicklungstätigkeit, Pub. No. WL 40 204 DA, p. 2, FAG Kugelfischer Georg Schäfer KGaA, Apr. 1991.

* cited by examiner

*Primary Examiner*—Richard M. Lorence
(74) *Attorney, Agent, or Firm*—Sughrue, Mion, Zinn, Macpeak & Seas, PLLC

(57) ABSTRACT

A ball bearing 36 supports a rotor 35 of an electromagnetic clutch 31 in such a manner that the rotor 35 can be rotated about the axis of the ball bearing 36. The ball bearing 36 includes an outer race 12, an inner race 13, a ball 14, and a retainer 15. The outer and inner races 12 and 13 are each formed in a circular-ring shape. The ball 14 is rollingably interposed between the outer and inner races 12 and 13. In the inner peripheral surface 16 and outer peripheral surface 17 of the outer and inner races 12 and 13, there are respectively formed grooves 12a and 13a each of which extends along the race peripheral direction and has an arc-shaped section. The grooves 12a and 13a are each formed in such a range in which their respective radii of curvature re and ri satisfy $1.0 \leq (re+ri)/Da \leq 0.9746 \, (Da/dm)^{-0.0304}$, where Da: the diameter of the ball, and dm: the mean value of the diameters of the inner and outer races of the ball bearing. Accordingly, it is possible to provide a ball bearing which can restrict the relative shift of the inner and outer races of the ball bearing along the axis of the ball bearing.

18 Claims, 5 Drawing Sheets

BALL BEARING AND ELECTROMAGNETIC CLUTCH HAVING THE SAME

BACKGROUND OF THE INVENTION

The present invention relates to an electromagnetic clutch which transmits and cuts off power to a compressor employed in a freezing cycle of a vehicle such as a car or the like, and also a ball bearing for applicable in the above electromagnetic clutch.

In a vehicle such as a car or the like, there is employed an electromagnetic clutch which is used to transmit or cut off rotation drive force generated by a running engine to a compressor provided in a freezing cycle such as an air conditioner (an air conditioning system) or the like.

The electromagnetic clutch comprises a rotary body made of metal used as magnetic material such as iron or the like, a body to be rotated made of metal used as magnetic material such as iron or the like, an electromagnetic coil, a bearing for supporting the rotary body in a freely rotatable manner, and the like; and, the electromagnetic clutch allows the rotary body and the to-be rotated body to attract each other due to the attracting force of an electromagnetic coil, thereby being able to carry out the above-mentioned transmission and cut-off of the rotation drive force.

Japanese Patent Unexamined Publication No. Hei. 8-114241 discloses the rotary body of the above-mentioned electromagnetic clutch. The rotary body is supported by a double row ball bearing in which a plurality of balls are arranged along the axis of the ball bearing serving as a center of rotation. This raises a tendency that the width of the double row ball bearing along the axial direction thereof becomes large and thus the electromagnetic clutch itself becomes large in size. As a result of this, the weight of the electromagnetic clutch is caused to increase, thereby increases the manufacturing cost of the electromagnetic clutch.

Also, in the case when, to support the rotary body in a freely rotatable manner, there is used a single row ball bearing in which a single ball is arranged along the axis of the ball bearing, since the sections of grooves formed in the outer and inner races of the single row ball bearing are each formed in a single arc shape, there arises a tendency that a relative shift (which is hereinafter referred to as an axial shift) between the inner and outer races along the axis of the ball bearing becomes large. In general, with limit of elements such as a voltage capable of generating the attracting force of the electromagnetic clutch and the like taken into account, a clearance between the rotary body and the to-be rotated body of the electromagnetic clutch, preferably, may be relatively small, for example, about 0.5 mm.

Further, if the conventional single row ball bearing is used to support the rotary body of the electromagnetic clutch, because the axial shift of this single row ball bearing is large, even when the electromagnetic coil does not generate an attracting force, there is a possibility that the rotary body and the to-be rotated body can be contacted with each other, so that there is a fear that the rotary body and the to-be rotated body can be damaged due to such mutual contact.

SUMMARY OF THE INVENTION

Accordingly, an object of the present invention is to solve the above-mentioned conventional problem. It is an object of a first aspect of the present invention to provide a ball bearing which is able to restrict the relative shift between the inner and outer races thereof along the axis of the ball bearing. In addition, it is also an object of a second aspect of the present invention to provide an electromagnetic clutch having the same, which can prevent a rotary body and a to-be rotated body from contacting each other.

In attaining the above-object, according to a first aspect of the present invention, there is provided a ball bearing comprising an outer race, an inner race, and a ball rollably interposed between the outer and inner races, each of the outer and inner races including a groove having an arc-shaped section formed in the contact surfaces thereof with respect to the ball so as to extend in the peripheral direction thereof, wherein the radius of curvature re of the groove of the outer race and the radius of curvature ri of the groove of the inner race each satisfies at least one of three equations below, $$1.0 \leq (re+ri)/Da \leq 0.9746(Da/dm)^{-0.0304}, \quad (1)$$

$$1.0 \leq (re+ri)/Da \leq 0.976(Da/dm)^{-0.0255}, \quad (2)$$

and $$1.0 \leq (re+ri)/Da \leq 0.9638(Da/dm)^{-0.0315}, \quad (3)$$

where Da: the diameter of the ball, and dm: the mean value of the diameters of the grooves of the inner and outer races.

With a ball bearing according to the present invention, the axial shift of the ball bearing can be restricted.

Moreover, the above-mentioned object can also be achieved by an electromagnetic clutch which comprises: a rotary body, a to-be rotated body, an electromagnetic coil, and a ball bearing. The rotary body is made of metal serving as magnetic material, can be driven or rotated by a drive source and includes a friction surface. The to-be rotated body is made of metal serving as magnetic material and includes a to-be rubbed surface disposed opposed to the friction surface of the rotary body. The electromagnetic coil is that when energized, generates a magnetic force to attract at least one of the rotary body and the to-be rotated body, thereby allowing the friction surface of the rotary body and the to-be rubbed surface of the to-be rotated body to attract each other. The ball bearing supports the rotary body in such a manner that the rotary body is free to rotate.

In the above-mentioned electromagnetic clutch according to the present invention, it is preferable that the ball bearing comprising an outer race, an inner race, and a ball rollably interposed between the outer and inner races, each of the outer and inner races including a groove having an arc-shaped section formed in the contact surfaces thereof with respect to the ball so as to extend in the peripheral direction thereof, wherein the radius of curvature re of the groove of the outer race and the radius of curvature ri of the groove of the inner race each satisfies at least one of three equations below, $$1.0 \leq (re+ri)/Da \leq 0.9746(Da/dm)^{-0.0304}, \quad (1)$$

$$1.0 \leq (re+ri)/Da \leq 0.976(Da/dm)^{-0.0255}, \quad (2)$$

and $$1.0 \leq (re+ri)/Da \leq 0.9638(Da/dm)^{-0.0315}, \quad (3)$$

where Da: the diameter of the ball, and dm: the mean value of the diameters of the grooves of the inner and outer races.

With the electromagnetic clutch according to the present invention, since there is used the ball bearing in order to support the rotary body in a ratable manner, the width of the electromagnetic clutch along the axial direction of the ball bearing can be restricted.

DETAILED DESCRIPTION OF THE INVENTION

In the first aspect of the present invention, there is provided a ball bearing comprising an outer race, an inner race, and a ball rollably interposed between the outer and inner races, each of the outer and inner races including a groove having an arc-shaped section formed in the contact surfaces thereof with respect to the ball so as to extend in the peripheral direction thereof, wherein the radius of curvature re of the groove of the outer race and the radius of curvature ri of the groove of the inner race each satisfies $$1.0 \leq (re+ri)/Da \leq 0.9746(Da/dm)^{-0.03041},$$

where Da: the diameter of the ball, and dm: the mean value of the diameters of the grooves of the inner and outer races.

According to the present invention, the ball bearing is formed in such a manner that the radius of curvature re of the groove of the outer race and the radius of curvature ri of the groove of the inner race each satisfies the following equation 1:

$$1.0 \leq (re+ri)/Da \leq 0.9746(Da/dm)^{-0.03041} \quad \text{equation 1,}$$

where Da: the diameter of the ball, and dm: the mean value of the diameters of the grooves of the inner and outer races. The equation 1 can be obtained in the following procedure.

Figure 3:
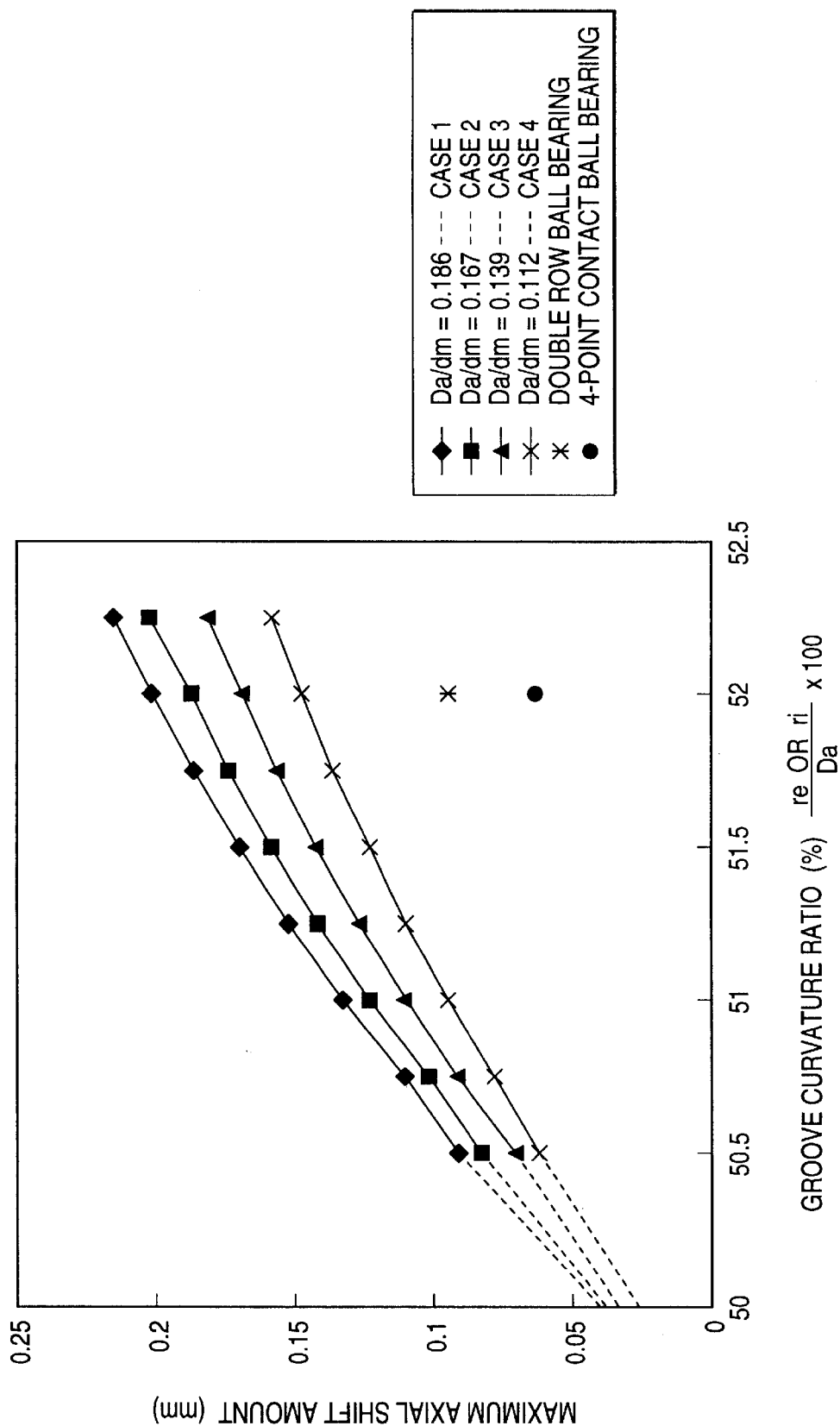
FIG. 3 is a garaphical representation showing variations in the maximum axial shift amount with respect to variation of the radii of curvature of the outer and inner grooves of a ball bearing.

At first, in a single row ball bearing in which the values of Da/dm are different from each other and a single ball is arranged along the axis of the ball bearing, there were found by simulation the maximum axial shift amounts of the outer peripheral surface of an outer race with respect to an inner race when the radii of curvature re and ri of the respective grooves of the inner and outer races were caused to vary. The results of this simulation are shown in FIG. 3, while the conditions of this simulation are shown in Table 1. In this simulation, the radii of curvature re and ri of the respective grooves of the inner and outer races are set equal to each other and, at the same time, as reference examples, there are shown a double row bearing and a 4-point contact ball bearing in which contact points between the ball and inner and outer races are present at four positions in a section thereof. Also, in ball bearings respectively shown in cases 1 to 4, outer and inner races as well as balls are all made of steel.

TABLE 1

|  | case 1 | case 2 | case 3 | case 4 |
|---|---|---|---|---|
| Axial shift of bearing and pulley [mm] | 10 | | | |
| Radial load [kgf] | 100 | | | |
| Bearing pitch diameter [mm] | 42.7 | | | |
| Bearing radial clearance [mm] | 0.02 | | | |
| Diameter of ball [mm] | 7.938 | 7.114 | 5.953 | 4.763 |
| Number of balls | 10 | 11 | 13 | 16 |

Next, in the respective cases 1 to 4, there were obtained the groove curvature ratios that can provide the maximum axial shift amount of 0.15 mm, and from a plurality of Da/dm values and the thus obtained groove curvature ratios, according to a least squares method, there were obtained curved lines which can be expressed by the following equation 2.

$$(re+ri)/Da = 0.9746(Da/dm)^{-0.0304} \quad \text{equation 2.}$$

According to a similar procedure, if there are obtained the respective groove curvature ratios that can provide the maximum axial shift amounts of 0.125 mm and 0.1 mm, then there can be obtained the curved lines that are respectively expressed by the following equations 3 and 4.

$$(re+ri)/Da = 0.976(Da/dm)^{-0.0255} \quad \text{equation 3}$$

$$(re+ri)/Da = 0.9638(Da/dm)^{-0.0315} \quad \text{equation 4}$$

Therefore, in a ball bearing as set forth in claim 1, even if only one ball is arranged along the axis of the ball bearing, the axial shift amount of the ball bearing is of 0.15 mm or less, that is, the axial shift amount of the ball bearing can be restricted. Accordingly, the relative shift of the inner and outer races along the axis of the ball bearing can be restricted.

Also, according to the above equation 3, there can be obtained a ball bearing which will be described below.

That is, a ball bearing comprising an outer race, an inner race, and a ball rollingably interposed between the outer and inner races, each of the outer and inner races including a groove having an arc-shaped section formed in the contact surfaces thereof with respect to the ball so as to extend in the peripheral direction thereof, wherein the radius of curvature re of the groove of the outer race and the radius of curvature ri of the groove of the inner race each satisfies $1.0 \leq (re+ri)/Da \leq 0.976\,(Da/dm)^{-0.0255}$, where Da: the diameter of the ball, and dm: the mean value of the diameters of the grooves of the inner and outer races.

In the present bearing, the radius of curvature re of the groove of the outer race and the radius of curvature ri of the groove of the inner race are each set in the range that satisfies the following equation 5.

$$1.0 \leq (re+ri)/Da \leq 0.976(Da/dm)^{-0.0255} \quad \text{equation 5}$$

That is, in the present bearing, since the axial shift amount of the ball bearing is of 0.125 mm or less, the axial shift amount of the ball bearing can be restricted. Accordingly, the relative shift amount of the inner and outer races along the axis of the ball bearing can be restricted.

Further, according to the above equation 4, there can be obtained a ball bearing which will be described below.

That is, a ball bearing comprising an outer race, an inner race, and a ball rollably interposed between the outer and inner races, each of the outer and inner races including a groove having an arc-shaped section formed in the contact surface thereof with respect to the ball so as to extend in the peripheral direction thereof, wherein the radius of curvature re of the groove of the outer race and the radius of curvature ri of the groove of the inner race each satisfies $1.0 \leq (re+ri)/Da \leq 0.9638 (Da/dm)^{-0.0315}$, where Da: the diameter of the ball, and dm: the mean value of the diameters of the grooves of the inner and outer races.

In the present bearing, the radius of curvature re of the groove of the outer race and the radius of curvature ri of the groove of the inner race are each set in the range that satisfies the following equation 6.

$$1.0 \leq (re+ri)/Da \leq 0.9638(Da/dm)^{-0.0315} \qquad \text{equation 6}$$

That is, in the present bearing, since the axial shift amount of the ball bearing is of 0.1 mm or less, the axial shift amount of the ball bearing can be restricted. Accordingly, the relative shift amount of the inner and outer races along the axis of the ball bearing can be restricted.

Also, the above-mentioned ball bearing, preferably, may be structured such that the radius of curvature re of the groove of the outer race and the radius of curvature ri of the groove of the inner race are each satisfies the following equation 7.

$$1.006 \leq (re+ri)/Da \qquad \text{equation 7}$$

Generally, in a ball bearing, the minimum value of $(re+ri)/Da$ is 1.0 in theory. However, as the radii of curvature of the outer and inner race grooves decrease, the contact areas between the outer and inner races with the balls increase, so that the outer and inner races and the balls are made easy to wear. Also, if the radii of curvature of the outer and inner race grooves are set at the minimum values in theory, then due to the tolerance of in manufacturing the grooves, the radii of curvature of the outer and inner race grooves are set smaller than the minimum values in theory, which makes it difficult for the ball bearing to rotate smoothly. In view of these, if the radii of curvature of the grooves each satisfies the above-mentioned equation 7, then abrasion or wear of the respective outer and inner races with respect to the balls can be restricted, thereby being able to rotate the ball bearing smoothly.

Figure 4:
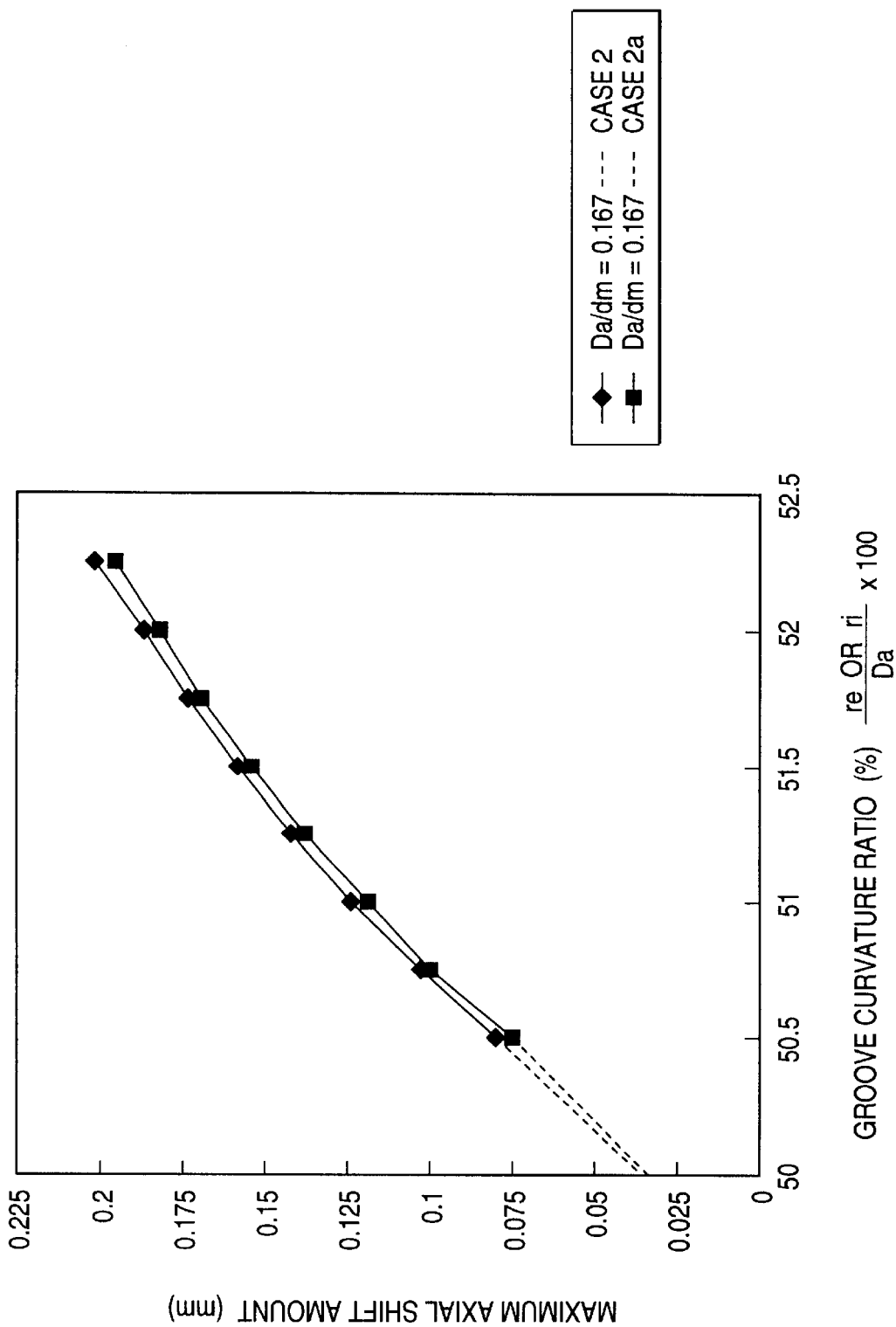
FIG. 4 is a graphical representation showing variations in the maximum axial shift amount of another ball bearing with respect to variation of the radii of curvature of the outer and inner grooves of the ball bearing.

Further, the ball of the above-mentioned ball bearing, preferably, may be made of ceramics. In the case 2 shown in the previously discussed table 1, the results (which are shown as a case 2a) of a simulation using balls each made of ceramics are shown in FIG. 4. In FIG. 4, there is also shown, as a comparison example, the results of the case 2 of which are shown in Table 1.

According to the simulation results shown in FIG. 4, preferably, the axial shift amounts of inner and outer races of the ball bearing may be set equal to each other: that is, in this case, the radii of curvatures of the inner and outer race grooves can be set large. Accordingly, although the contact pressure thereof rises, the calorific power (PV value) decreases, which makes it possible to reduce the abrasion of the ball bearing and also the bearing torque. Of course, if the radii of curvatures of the inner and outer race grooves are set small, then there are obtained the opposite results of the above results; however, if the radii of curvatures of the inner and outer race grooves are selected properly in the range of the present invention according to the performance of the ball bearing required, a wider range of freedom of the ball bearing in design can be obtained.

Also, as a ball bearing, preferably, there may be employed a 4-point contact ball bearing in which a ball and outer and inner races can be contacted with each other at four points. In this case, from the simulation results shown in FIG. 3, the maximum axial shift amount can be restricted.

Next, description will be given below of the relationship between the axial shift amounts δ of a ball bearing and the increase values in the temperature of the ball bearing.

Figure 5:
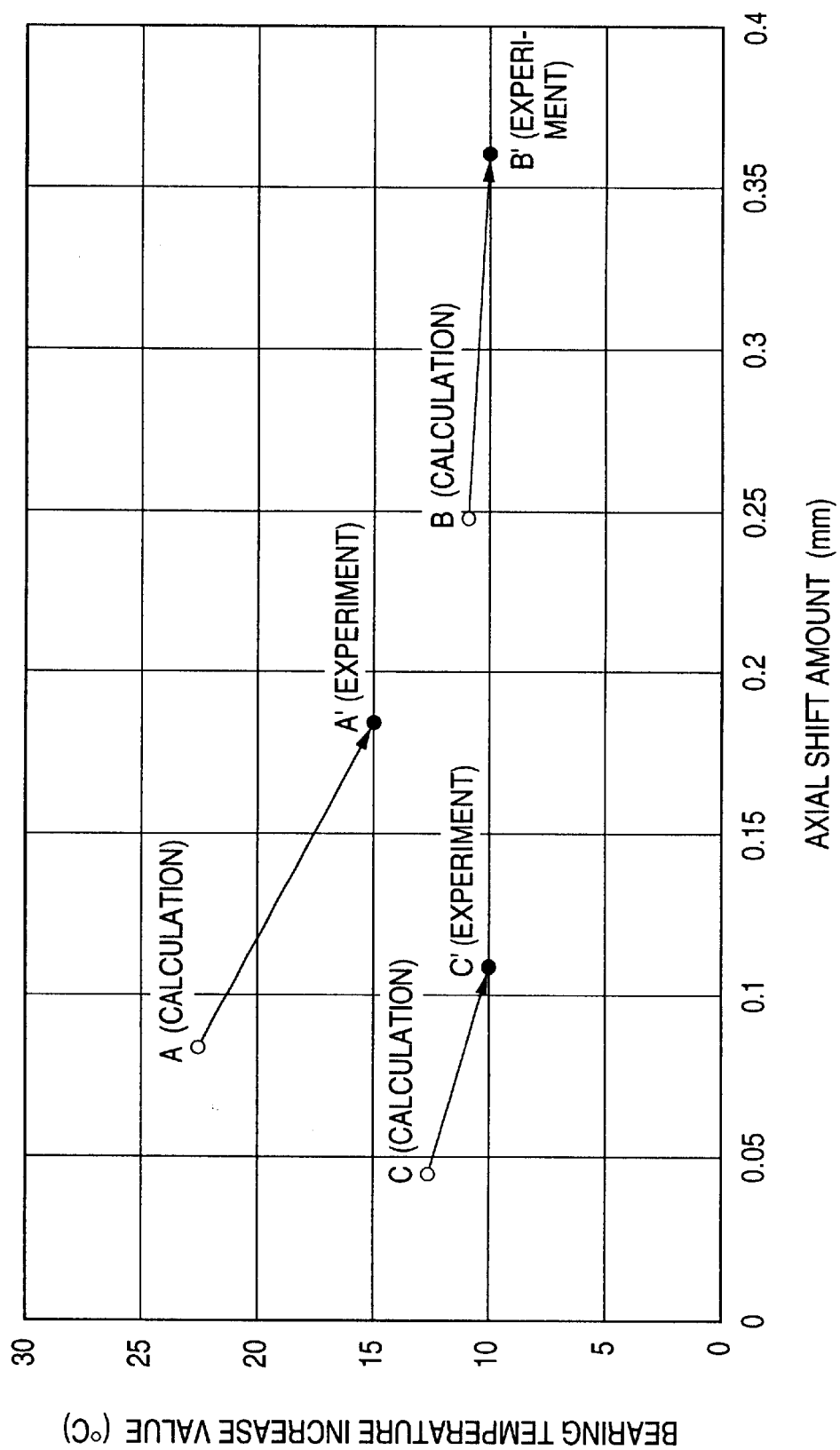
FIG. 5 is a graphical representation showing the relationship between the axial shift amounts of a ball bearing and the temperature increase values of the ball bearing.

In FIG. 5, there is shown the relationship between the axial shift amounts δ of ball bearings A, A', B, B', C, C' and the increase value in the temperature of the ball bearing. Here, the ball bearing A is a single row ball bearing according to the present invention in which $(re+ri)/Da=1.014$ is set, the radii of curvature of outer and inner races thereof each satisfies the equation 6, and, in calculation, the axial shift amount $\delta \leq 0.10$ mm is obtained. On the other hand, the ball bearing B is a single row ball bearing, as a comparison example, in which $(re+ri)/Da=1.04$ is set, and in calculation, the axial shift amount $\delta \leq 0.15$ mm is obtained, but the radii of curvature of outer and inner races thereof do not satisfy the equation 1. Also, the ball bearing C is a double row angular ball bearing which has been used in a conventional electromagnetic clutch.

In each of the ball bearings A, B and C, Da=7.144, and dm=42.7 mm are satisfied. As conditions in calculation, a radial load is set for 150 kgf, a radial clearance is set for 0μm, an offset amount, which is a shift amount between the ball bearing and pulley in the axial direction, is set for 5 mm, and the number of rotations is set for 4000 rpm. The bearing temperature increase values in calculation are obtained by finding calorific power by calculation and then converting the thus found calorific power to the temperature increase values.

Further, with conditions for actual use taken into account, severer conditions than the conditions in calculation, that is, a radial clearance of 21 μm, an offset amount of 10 mm and the number of rotations of 7000 rpm were added to the ball bearings A, B and C obtained in calculation to thereby obtain the ball bearings A', B' and C'; and the relationship between the axial shift amounts δ of and the increase value in the temperature in the thus obtained ball bearings A', B' and C' were then found by experiments. The results of the experiments are shown in FIG. 5.

Evaluations on the respective experiments are shown in the following table 2.

TABLE 2

| | re + re/da | Calculation equation | Evaluation (Experiments) |
|---|---|---|---|
| Ball bearing A' | 1.014 | Satisfies equation 6 | Axial shift amount: about 0.19 mm Temperature increase: 15° C. |
| Ball bearing B' | 1.014 | Not satisfy equation 1 | Axial shift amount: about 0.19 mm Temperature increase: 15° C. |
| Ball bearing C' | | | Axial shift amount: about 0.19 mm Temperature increase: 15° C. |

In the ball bearing A', the axial shift amount and temperature increase value are both approximate to those of the double row angular ball bearing.

A double row ball bearing, due to the structure thereof, can restrict its axial shift amount when compared with a single row ball bearing, however, as described before, the width of the double row ball bearing along the axial direction thereof is large, which leads to an increase in the size of an electromagnetic clutch itself as well as the weight thereof.

On the other hand, in the single row ball bearing, its width along the axial direction thereof can be made small. Accordingly, feature of the present invention is that while using a single row ball bearing, it can provide such axial shift amount value and temperature increase value that are approximate to those provided by the double row ball bearing.

On the other hand, in the ball bearing B' taken as a comparison example, its axial shift amount is outstandingly large when compared with the ball bearing A' according to the present invention. Since the ball bearing B' as a comparison example is large in (re+ri)/Da, sliding between the races (inner and outer races) and the rolling bodies (balls) is small and thus shows the same temperature increase value as the double row ball bearing C'.

In general, in a ball bearing, there is disposed a seal member which is used to seal a clearance between the outer and inner races of the ball bearing. The seal member is arranged so as to extend over the two sides of the clearance between the outer and inner races in such a manner that the outer peripheral edge of the seal member is fixed to the outer race, whereas the inner peripheral edge thereof is used as a lip portion which can be slid in contact with the inner race.

If the axial shift amount of a ball bearing increases, then the contact of the lip portion of the seal member in sliding contact with the inner race becomes uneven to thereby lower the sealing performance of the seal member. In view of this, a water injecting test was conducted on the surfaces of typical ball bearings each with a seal member employed therein to evaluate the sealing performance by the seal member of the respective ball bearings.

Figure 6:
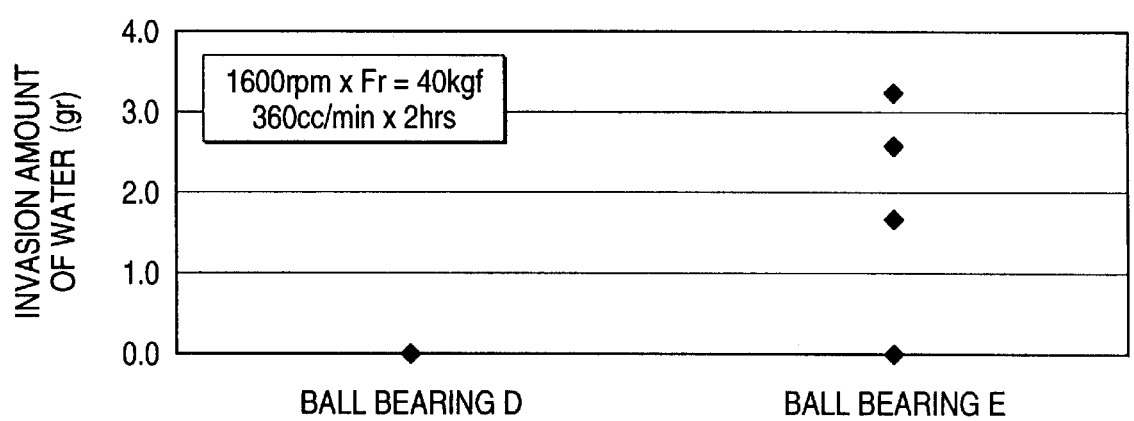
FIG. 6 is a graphical representation showing the results of a water injecting test conducted on typical ball bearings.

This water injecting test is a test in which water is injected onto the surface of a ball bearing with a seal member mounted thereon to measure the invasion amount of the water into the inside of the seal member of the ball bearing. Specifically, a contact-type rubber seal is used as a seal member to thereby produce a ball bearing having a sealed-type structure; and, a water injecting test was conducted on the sealed-type ball bearing under the conditions that an offset amount is 10 mm, a radial clearance is 21 $\mu$m, and the number of rotations is 1600 rpm. As a result of this test, as shown in FIG. 6, in a ball bearing E in which its axial shift amount is more than 0.35 mm, a clearance between the lip portion of the seal member and the seal groove of the inner race was uneven and the water invaded through the large clearance portion. On the other hand, in a ball bearing D in which its axial shift amount is equal to or less than 0.2 mm, any such invasion of water could not be observed.

That is, the water injecting test has shown that, in a ball bearing according to the present invention which is able to restrict its axial shift amount to 0.15 mm or less, a high sealing performance can be maintained.

Now, description will be given below of an embodiment according to the present invention of a ball bearing and an electromagenetic clutch having the same with reference to FIGS. 1 and 2.

Figure 1:
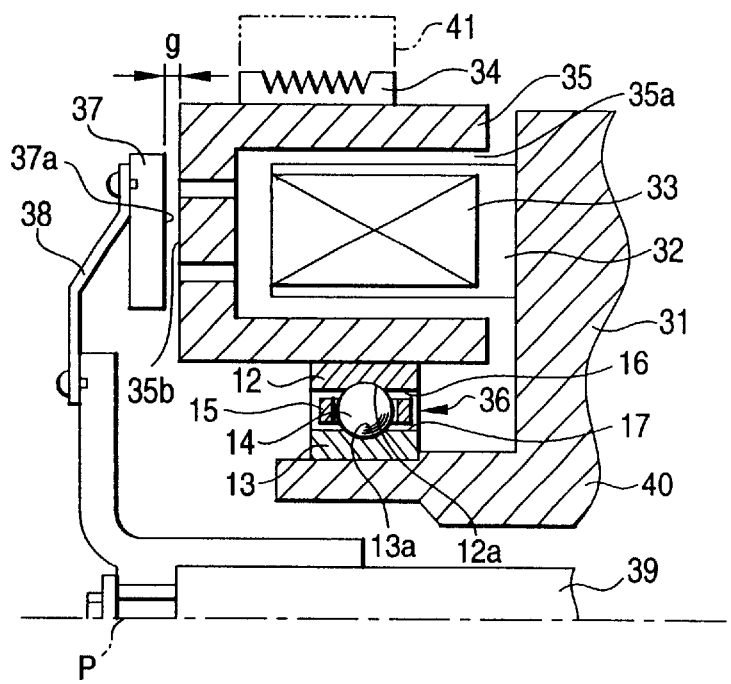
FIG. 1 is a schematic section view showing an embodiment of an electromagnetic clutch according to the present invention.

In FIG. 1, an electromagnetic clutch 31 is a device which is employed in a vehicle such as a car or the like to transmit and cut off a rotation drive force to a compressor disposed in a freezing cycle such as an air conditioner (air conditioning system). The rotation drive force is generated by a running engine.

The electromagnetic clutch 31, as shown in FIG. 1, comprises a stator 32 to be fixed to a compressor housing 40, an electromagnetic coil 33 stored within the stator 32, a pulley 34 with a multi-stage type V belt 41 wound around the pulley 34 for transmitting the rotation drive force of an engine, a rotor 35 which includes the pulley 34 mounted on the outer periphery of the rotor 35 and also serves as a rotary body, a ball bearing 36 for supporting the rotor 35 in such a manner as to be rotatable about an axis P, an armature 37 which can be attracted to the rotor 35 due to a magnetic force generated by the electromagnetic coil 33 and thus serves as a to-be rotated body, an armature support portion 38 composed of one or more members for transmitting the rotation drive force of the armature 37 to a compressor (not shown), and a compressor shaft 39.

The rotor 35 is made of metal serving as magnetic material such as iron or the like. The rotor 35 is also formed so as to have a substantially U-shaped section, while the rotor 35 includes a recessed portion 35a facing on the opposite side of the armature 37 and a friction surface 35b disposed on the opposite side of the recessed portion 35a. The recessed portion 35a of the rotor 35 stores the stator 32 therein.

The ball bearing 36 is fitted into between the rotor 35 and compressor housing 40. The ball bearing 36, as shown in FIG. 2, also comprises an outer race 12 and an inner race 13 each formed in a circular-ring shape, a ball 14 interposed rollably between the outer and inner races 12 and 13, and a retainer 15 for holding the ball 14 between the outer and inner races 12 and 13.

The outer and inner races 12 and 13 respectively include grooves 12a and 13a each having an arc-shaped section along the race peripheral direction which are respectively formed in the inner peripheral surface 16 of the outer race 12 and in the outer peripheral surface 17 of the inner race 13. These grooves 12a and 13a respectively have radii of curvature re and ri which are set in such a range as can satisfy any one of the above-mentioned equations 1, 5 and 6. Also, the ball bearing 36 composed of a single row ball bearing in which only the single ball 14 is arranged along the axis P. The outer and inner races 12 and 13 can be rotated about the axis P respectively.

Figure 2:
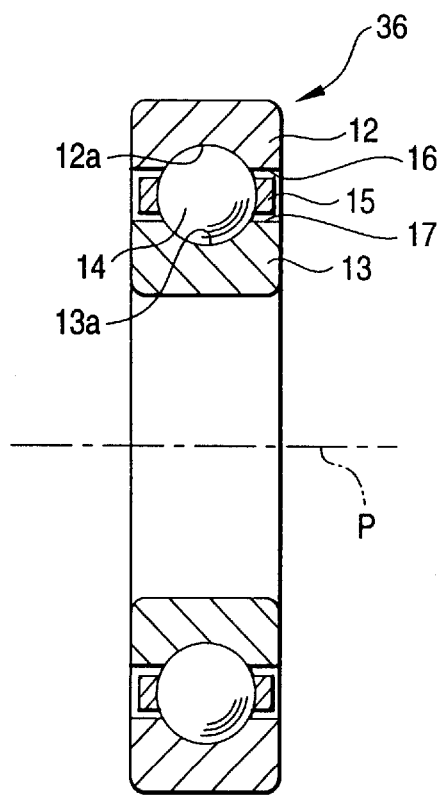
FIG. 2 is a section view showing an embodiment of a ball bearing according to the present invention.

In FIG. 2, there is shown a rolling bearing in which a seal member and a shield plate are not included, that is the basic structure of a rolling bearing. With the structure shown in FIG. 2 as the reference structure, there can be also employed other various structures selectively according to cases: for example, two contact-type rubber seal may be respectively provided on the two sides of the bearing to thereby provide a sealed structure; two shield plate may be respectively provided on the two sides of the bearing to thereby provide a shielded structure; a contact-type rubber seal maybe provided on one side of the bearing to thereby provide a sealed structure; a shield plate may be respectively provided on one side of the bearing to thereby provide a shielded structure; or other similar structures.

The thus structured ball bearing 36 supports the rotor 35 in such a manner that the rotor 35 can be rotated about the axis P with respect to the compressor housing 40. The outer race 12 is fitted and contacted with the inner periphery of the rotor 35, while the inner race 13 is fitted and contacted with the outer periphery of the hub of the compressor housing 40.

The pulley 34, around which the multi-stage type V belt 41 is to be wound, is fixed to the outer periphery of the rotor 35 by a connecting technique such as by welding or the like. The pulley 34 is structured such that it always receives the rotation force of the engine through the V belt 41 and thus can be rotated together with the rotor 35.

The rotor 35 is rotatably supported by the ball bearing 36. When a rotation drive force from a drive source such as an engine or the like is transmitted thereto through the multi-stage type V belt 41, pulley 34 and the like, the rotor 35 can be rotated about the axis P. Therefore, the friction surface 35b of the rotor 35 can be driven or rotated by the drive source such as an engine or the like.

The armature 37 is made of metal serving as magnetic material such as iron or the like and includes a surface to be rubbed 37a which is disposed opposed to the friction surface 35a of the rotor 35. The electromagnetic coil 33 can generate a magnetic force when it is electrically energized. In the illustrated example, if the electromagnetic coil 33 generates a magnetic force, then it attracts the armature 37 to thereby allow the friction surface 35b of the rotor 35 and the to-be rubbed surface 37a of the armature 37 attract each other. The mutual attraction of the friction surface 35b and the to-be rubbed surface 37a due to the magnetic force of the electromagnetic coil 33 transmits the rotation drive force, which has been transmitted through the multi-stage type V belt 41, puller 34 and the like, to the armature 37; and the armature 37 then transmits the thus received rotation drive force to a compressor through the armature support portion 38, compressor shaft 39 and the like.

The ball bearing 36 and pulley 34 are normally arranged at positions shifted from each other in a direction along the axis P in order to make the electromagnetic clutch 31 as compact as possible. The friction surface 35b of the rotor 35 and the to-be rubbed surface 37a of the armature 37 are designed such that, when the electromagnetic coil 33 is not in energized, there can be present a given gap g of a relatively small size, for example, about 0.5 mm between the two surfaces 35b and 37a. This given gap g is determined with the dimensional errors or mounting errors of the respective members taken into account. If the given gap g is set excessively large, then the magnetic force to be generated by the magnetic coil 33 must also be made large, and therefore, the gap g may be set at a minimum value with the above-mentioned elements taken into account.

Due to the above-mentioned structure, a radial load generated by the tensile force of the V belt 41 is allowed to act on the ball bearing 36 as an inclined moment load because the pulley 34 and ball bearing 36 are shifted in position from each other along the axis P.

At the then time, the grooves 12a and 13a of the outer and inner races 12 and 13 of the ball bearing 36 are respectively formed in such a manner that their respective radii of curvature re and ri can satisfy any one of the above-mentioned equations 1, 5 and 6. Therefore, when the ball bearing 36 is formed in such a manner that the respective radii of curvature re and ri can satisfy the equation 1, the maximum axial shift amount of the outer race 12 or the like of the ball bearing 36 can be restricted to 0.15 mm or less. Accordingly, the relative shift amount between the outer and inner races 12 and 13 along the axis P can be restricted, so that even when the electromagnetic coil 33 is not energized, contact between the rotor 35 and armature 37 can be prevented.

Also, when the outer and inner races 12 and 13 are respectively formed in such a manner that the respective radii of curvature re and ri can satisfy the equation 5, the maximum axial shift amount of the outer race 12 or the like of the ball bearing 36 can be restricted to 0.125 mm or less. Accordingly, the relative shift between the outer and inner races 12 and 13 along the axis P can be restricted, so that even when the electromagnetic coil 33 is not energized, contact between the rotor 35 and armature 37 can be prevented.

Further, when the outer and inner races 12 and 13 are respectively formed in such a manner that the respective radii of curvature re and ri can satisfy the equation 6, the maximum axial shift amount of the outer race 12 or the like of the ball bearing 36 can be restricted to 0.1 mm or less. Accordingly, the relative shift between the outer and inner races 12 and 13 along the axis P can be restricted, so that even when the electromagnetic coil 33 is not energized, contact between the rotor 35 and armature 37 can be prevented.

Also, preferably, the respective radii of curvature re and ri of the outer and inner races 12 and 13 may be respectively set in a range which can satisfy the above-mentioned equation 7. Accordingly, in this case, the outer and inner races 12 and 13 can be restricted respectively in abrasion with respect to the ball 14, so that they can be rotated smoothly.

Further, the ball 14 of the ball bearings 36, preferably, may be made of ceramics such as silicon nitride or the like. In this case, the respective radii of curvature re and ri of the outer and inner races 12 and 13 can be set large, which can preferably reduce the abrasion of the outer and inner races 12 and 13. Still further, the ball 14, more preferably, may be made of silicon nitride or silicon carbide. In this case, the maximum axial shift amount of the bearing can be restricted further more.

Also, the inner race 13 of the ball bearing 36, preferably, may be made of ceramics such as silicon nitride, or stainless steel.

In some cases, the temperature of the periphery of the electromagnetic clutch 31 can exceed 100° C. As inner race 13 of the ball bearing 36 is fitted and contacted with the compressor housing 40, when the fitted and contacted portion of the compressor housing 40 with the inner race 13 is formed of material such as aluminum having a larger coefficient of linear expansion than the stainless steel of which the ball bearing 36 is made, under the high temperature environment, the gap within the ball bearing 36 is eliminated due to the thermal expansion of the compressor housing 40, which undesirably can raise a possibility that the ball bearing 36 cannot be rotated smoothly.

However, when the inner race 13 is made of material having a small coefficient of linear expansion such as silicon nitride or stainless steel, the thermal expansion of the inner race 13 can be restricted, which makes it possible to prevent the gap within the ball bearing 36 from being eliminated due to the thermal expansion of the compressor housing 40. Therefore, in this case, even under the high temperature environment, the smooth rotation of the ball bearing 36 can be secured.

Further, as the ball bearing 36, there may also be used a 4-point contact ball bearing in which the ball 14 and the outer and inner races 12, 13 can be contacted with each other at four points. In this case, the axial shift of the ball bearing 36 can be restricted further positively. Also, in the case of the 4-point contact ball bearing, from the viewpoint of prevention of biased abrasion, preferably, the respective inner surfaces of the grooves 12a and 13a serving as the raceway surfaces of the outer and inner races 12 and 13 maybe nitrified.

With use of the ball bearing 36 according to the present embodiment, since the respective radii of curvature re and ri of the grooves 12a and 13a of the outer and inner races 12 and 13 satisfy any one of the above-mentioned equations 1, 5 and 6, the axial shift of the ball bearing can be restricted. Thanks to this, the mutual shift between the outer and inner races 12 and 13 along the axis P can be restricted.

Also, in the electromagnetic clutch 31 according to the present embodiment, there is used a single row ball bearing 36 in order to support the rotor 35 in a rotatable manner. This can restrict the width of the ball bearing 36 along the direction of the axis P, thereby being able to reduce the size of the ball bearing 36. That is, the ball bearing 36 can be made compact; and, in particular, an increase in the size of the ball bearing 36 can be prevented and also the weight and manufacturing cost of the ball bearing 36 can be reduced.

Further, according to the present electromagnetic clutch 31, since the grooves 12a and 13a of the outer and inner races 12 and 13 of the ball bearing 36 employed in the electromagnetic clutch 31 are respectively formed in such a manner that their respective radii of curvature satisfy any one of the above-mentioned equations 1, 5 and 6, the relative axial shift between the outer and inner races 12 and 13 of the ball bearing 36 along the axis P can made smaller than the gap g formed between the friction surface 35b of the rotor 35 and the to-be rubbed surface 37a of the armature 37. Therefore, even when the electromagnetic coil 33 is not energized electrically, the rotor 35 and armature 37 are prevented against mutual contact, which can prevent the damage of the rotor 35 and armature 37.

According to the above-mentioned embodiment, there can be obtained an electromagnetic clutch which will be described below:

(Note 1)

An electromagnetic clutch which comprises: a rotary body, a to-be rotated body, an electromagnetic coil, and a ball bearing. The rotary body is made of metal serving as magnetic material, can be driven or rotated by a drive source and includes a friction surface. The to-be rotated body is made of metal serving as magnetic material and includes a to-be rubbed surface disposed opposed to the friction surface of the rotary body. The electromagnetic coil is that when energized, generates a magnetic force to attract at least one of the rotary body and the to-be rotated body, thereby allowing the friction surface of the rotary body and the to-be rubbed surface of the to-be rotated body to attract each other. The ball bearing supports the rotary body in such a manner that the rotary body is free to rotate.

(Note 2)

An electromagnetic clutch as set forth in Note 1, wherein the ball bearing comprises an outer race, an inner race, and a ball rollably interposed between the outer and inner races, while, in the respective contact surfaces of the outer and inner races with respect to the ball, there are formed grooves each having an arc-shaped section along the race peripheral direction in such a manner that the radius of curvature re of the groove in the outer race and the radius of curvature ri of the groove in the inner race are respectively set in the range that satisfies $1.0 \leq (re+ri)/Da \leq 0.9746 (Da/dm)^{-0.0304}$. Da: the diameter of the ball, dm: the mean value of the diameters of the inner and outer races of the ball bearing.

(Note 3)

An electromagnetic clutch as set forth in Note 1, wherein the ball bearing comprises an outer race, an inner race, and a ball rollably interposed between the outer and inner races, while, in the respective contact surfaces of the outer and inner races with respect to the ball, there are formed grooves each having an arc-shaped section along the race peripheral direction in such a manner that the radius of curvature re of the groove in the outer race and the radius of curvature ri of the groove in the inner race are respectively set in the range that satisfies $1.0 \leq (re+ri)/Da \leq 0.976(Da/dm)^{-0.0255}$. Da: the diameter of the ball, dm: the mean value of the diameters of the inner and outer races of the ball bearing.

(Note 4)

An electromagnetic clutch as set forth in Note 1, wherein the ball bearing comprises an outer race, an inner race, and a ball rollably interposed between the outer and inner races, while, in the respective contact surfaces of the outer and inner races with respect to the ball, there are formed grooves each having an arc-shaped section along the race peripheral direction in such a manner that the radius of curvature re of the groove in the outer race and the radius of curvature ri of the groove in the inner race are respectively set in the range that satisfies $1.0 \leq (re+ri)/Da \leq 0.963(Da/dm)^{-0.0315}$. Here, Da: the diameter of the ball, dm: the mean value of the diameters of the inner and outer races of the ball bearing.

According to the electromagnetic clutch as set forth in Note 1, since there is used the ball bearing in order to support the rotary body in a ratable manner, the width of the electromagnetic clutch along the axial direction of the ball bearing can be restricted. Therefore, the electromagnetic clutch can be made compact; and, in particular, an increase in the size of the electromagnetic clutch can be prevented as well as the weight and manufacturing cost of the electromagnetic clutch can be reduced.

According to the electromagnetic clutch as set forth in Notes 2 to 4, in addition to the effects that prevention of an increase in the size as well as reduction of the weight and manufacturing cost of the electromagnetic clutch are possible, since the respective radii of curvature re and ri of the outer and inner grooves of the ball bearing are set in the range that satisfies any one of the above-mentioned equations 1, 5 and 6, even when there is used a single row ball bearing in which a single ball is arranged along the axis thereof, the axial shift of the ball bearing along the axial direction thereof can be made smaller than the gap formed between the friction surface of the rotary body and the to-be rubbed surface of the to-be rotated body. Thanks to this, when the electromagnetic coil is not energized, the friction surface of the rotary body and the to-be rubbed surface of the to-be rotated body can be prevented from coming into contact with each other, thereby being able to prevent the damage of the rotary body and the to-be rotated body.

In a ball bearing according to the present invention, since the respective radii of curvature re and ri of the outer and inner grooves of the ball bearing are set in the range that satisfies any one of the above-mentioned equations 1, 5 and 6, the axial shift of the ball bearing can be restricted. Therefore, the range of the relative shift between the outer and inner races along the axis of the ball bearing can be restricted.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A ball bearing comprising:

an outer race;

an inner race; and a ball rollably interposed between the outer and inner races, wherein each of said outer and inner races includes a groove having an arc-shaped section formed in contact surfaces thereof with respect to the ball so as to extend in the peripheral direction thereof, wherein the radius of curvature re of the groove of the outer race and the radius of curvature ri of the groove of the inner race each satisfies at least one of three equations below, $$1.0 \leq (re+ri)/Da \leq 0.9746(Da/dm)^{-0.0304}, \quad (1)$$

$$1.0 \leq (re+ri)/Da \leq 0.976(Da/dm)^{-0.0255}, \quad (2)$$

$$1.0 \leq (re+ri)/Da \leq 0.9638(Da/dm)^{-0.0315}, \quad (3)$$

where Da: the diameter of the ball, and dm: the mean value of the diameters of the grooves of the inner and outer races.

2. The ball bearing according to claim 1, wherein the radius of curvature re of the groove of the outer race and the radius of curvature ri of the groove of the inner race each satisfies an equation, $$1.006 \leq (re+ri)/Da$$

where Da: the diameter of the ball.

3. The ball bearing according to claim 1, wherein the ball is made of ceramics.

4. The ball bearing according to claim 1, wherein said ball bearing is a 4-point contact ball bearing in which a ball and outer and inner races are contacted with each other at four points.

5. The ball bearing according to claim 1, wherein the maximum axial shift amount between said outer race and said inner race in an axial direction thereof is 0.15 mm or less.

6. A ball bearing comprising:

an outer race;

an inner race; and a ball rollably interposed between the outer and inner races, wherein each of said outer and inner races includes a groove having an arc-shaped section formed in contact surfaces thereof with respect to the ball so as to extend in the peripheral direction thereof, wherein the radius of curvature re of the groove of the outer race and the radius of curvature ri of the groove of the inner race each satisfies an equation, $$1.0 \leq (re+ri)/Da \leq 0.9746(Da/dm)^{-0.0304},$$

where Da: the diameter of the ball and dm: the mean value of the diameters of the grooves of the inner and outer races.

7. The ball bearing according to claim 6, wherein the radius of curvature re of the groove of the outer race and the radius of curvature ri of the groove of the inner race each satisfies an equation, $$1.0 \leq (re+ri)/Da \leq 0.976(Da/dm)^{-0.0255},$$

where Da: the diameter of the ball, and dm: the mean value of the diameters of the grooves of the inner and outer races.

8. The ball bearing according to claim 7, wherein the the radius of curvature re of the groove of the outer race and the radius of curvature ri of the groove of the inner race each satisfies an equation, $$(re+ri)/Da \leq 0.9638(Da/dm)^{-0.0315,}$$

where Da: the diameter of the ball, and dm: the mean value of the diameters of the grooves of the inner and outer races.

9. The ball bearing according to claim 6, wherein the the radius of curvature re of the groove of the outer race and the radius of curvature ri of the groove of the inner race each satisfies an equation, $$1.006 \leq (re+ri)/Da$$

where Da: the diameter of the ball.

10. The ball bearing according to claim 6, wherein the ball is made of ceramics.

11. The ball bearing according to claim 6, wherein said ball bearing is a 4-point contact ball bearing in which a ball and outer and inner races are contacted with each other at four points.

12. The ball bearing according to claim 6, wherein the maximum axial shift amount between said outer race and said inner race in an axial direction thereof is 0.15 mm or less.

13. An electromagnetic clutch which comprises:

a rotary body made of a magnetic material and driven by a drive source, said rotary body having a friction surface;

a to-be rotated body made of a magnetic material, said to-be rotated body having a to-be rubbed surface opposed to the friction surface of the rotary body;

an electromagnetic coil, when energized, generating a magnetic force to attract at least one of the rotary body and the-to-be rotated body, thereby allowing the friction surface of the rotary body and the to-be rubbed surface of the to-be rotated body to attract each other; and a ball bearing rotatably supporting said rotary body, wherein said ball bearing comprises:

an outer race;

an inner race; and a ball rollingably interposed between the outer and inner races, wherein each of said outer and inner races including a groove having an arc-shaped section formed in contact surfaces thereof with respect to the ball so as to extend in the peripheral direction thereof, wherein the radius of curvature re of the groove of the outer race and the radius of curvature ri of the groove of the outer race and the radius of curvature ri of the groove of the inner race each satisfies an equation, $$1.0 \leq (re+ri)/Da \leq 0.9746(Da/dm)^{-0.0304},$$

where Da: the diameter of the ball, and dm: the mean value of the diameters of the grooves of the inner and outer races.

14. The electromagnetic clutch according to claim 13, wherein the radius of curvature re of the groove of the outer race and the radius of curvature ri of the groove of the outer race and the radius of curvature ri of the groove of the inner race each satisfies at least one of two equations below, $$1.0 \leq (re+ri)/Da \leq 0.976(Da/dm)^{0.0255},$$

and $$1.0 \leq (re+ri)/Da \leq 0.9638(Da/dm)^{0.0315},$$

where Da: the diameter of the ball, and dm: the mean value of the diameters of the grooves of the inner and outer races.

15. The electromagnetic clutch according to claim 14, wherein the radius of curvature re of the groove of the outer race and the radius of curvature ri of the groove of the inner race each satisfies an equation, $$1.006 \leq (re+ri)/Da$$

where Da: the diameter of the ball.

16. The electromagnetic clutch according to claim 14, wherein the ball is made of ceramics.

17. The electromagnetic clutch according to claim 14, wherein said ball bearing is a 4-point contact ball bearing in which a ball and outer and inner races are contacted with each other at four points.

18. The electromagnetic clutch according to claim 14, wherein the maximum axial shift amount between said outer race and said inner race in an axial direction thereof is 0.15 mm or less.

* * * * *